United States Patent
Ekl et al.

(10) Patent No.: US 6,816,502 B2
(45) Date of Patent: Nov. 9, 2004

(54) METHOD OF COMMUNICATING WITH A PLURALITY OF SETS OF USERS

(75) Inventors: Randy L. Ekl, Lake Zurich, IL (US); Ron Rotstein, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 88 days.

(21) Appl. No.: 10/325,384

(22) Filed: Dec. 20, 2002

(65) Prior Publication Data

US 2004/0120342 A1 Jun. 24, 2004

(51) Int. Cl.[7] .............................................. H04L 12/413
(52) U.S. Cl. ...................................................... 370/447
(58) Field of Search ................................. 370/252, 254, 370/480, 274, 276, 277, 280, 281, 294, 295, 296, 319, 324, 334, 336, 337, 338, 339, 344, 345, 347, 350, 442, 498, 503, 507, 509, 510, 389, 401, 351, 352; 379/93.29, 90.01; 455/430, 428

(56) References Cited

U.S. PATENT DOCUMENTS 5,761,281 A * 6/1998 Baum et al. .............. 379/93.29
5,850,602 A * 12/1998 Tisdale et al. .............. 455/430

* cited by examiner

Primary Examiner—Dang Ton
(74) Attorney, Agent, or Firm—Terri S. Hughes

(57) ABSTRACT

An access point (100) transmits at least a first set of parameters intended for a first set of users (102) and a second set of parameters intended for a second set of users (104). The access point communicates with the first set of users during a first time period and communicates with the second set of users during a second time period, wherein the first time period and the second time period are exclusive of each other. Moreover, the first time period and the second time period lapse prior to the AP transmitting a next set of parameters intended for the first set of users.

18 Claims, 3 Drawing Sheets

METHOD OF COMMUNICATING WITH A PLURALITY OF SETS OF USERS

FIELD OF THE INVENTION

This invention relates generally to a method of communicating with a plurality of sets of users.

BACKGROUND OF THE INVENTION

Current wireless systems, most notably 802.11 wireless local area network ("WLAN") systems, operate in half-duplex mode on a single frequency. That is, the mobile stations in a wireless system either transmits or receives at any given time, not both simultaneously. Further, the mobile stations typically operate on a single frequency. Once a mobile station is on a frequency, it stays on that frequency.

A problem with today's wireless systems is that they only serve one group, where a group is a set of mobile stations with common characteristics. In the broad case, groups can be large classes of users. Examples of two different groups are city workers and public safety users (e.g., police personnel, fire personnel, or the like). In the technical configuration of the system, and specifically in the case of a WLAN access point ("AP"), the common set of technical characteristics includes frequency, service set identifier ("SSID"), and associations.

To serve multiple groups with existing technology requires multiple APs, which is typically not economically feasible. Further, multiple APs in close proximity exhibit interference issues, which non-deterministically decreases the throughput to both APs (in the best case), and may make the APs completely unusable (in the worst case).

Thus, there is a need for a method to allow multiple sets of users, which may or may not have common characteristics, to communicate with a common AP.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

Figure 1:
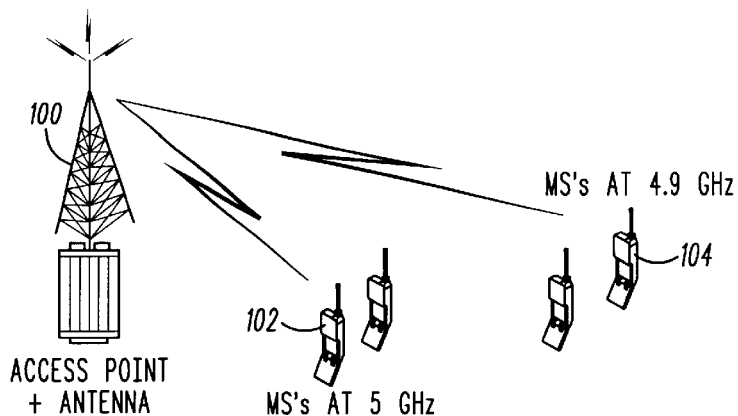
FIG. 1 illustrates a plurality of mobile stations operating at different frequency and within range of an access point in accordance with the present invention.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

The present invention proposes structuring the air interface messaging and/or frequency, specifically, as illustrated in FIG. 1, the AP 100 can communicate with at least two sets of users 102, 104 during a group aggregate communication time, wherein each set of users comprises at least one user. At least the two sets of users 102, 104 can operate on different channels/frequencies or in different modes. Multiple single group communication times can be utilized during the group aggregate communication time, which can serve a plurality of sets of users 102, 104, and the multiple single group communication times can then be modified for the next group aggregate communication time, to again serve a plurality of sets of users. The multiple single group communication times can be coordinated to best serve the aggregate plurality of sets of users 102, 104, based on pre-configured criteria within the system as well as dynamic criteria based on the usage of the system and specific user or sets of users requests.

Figure 2:
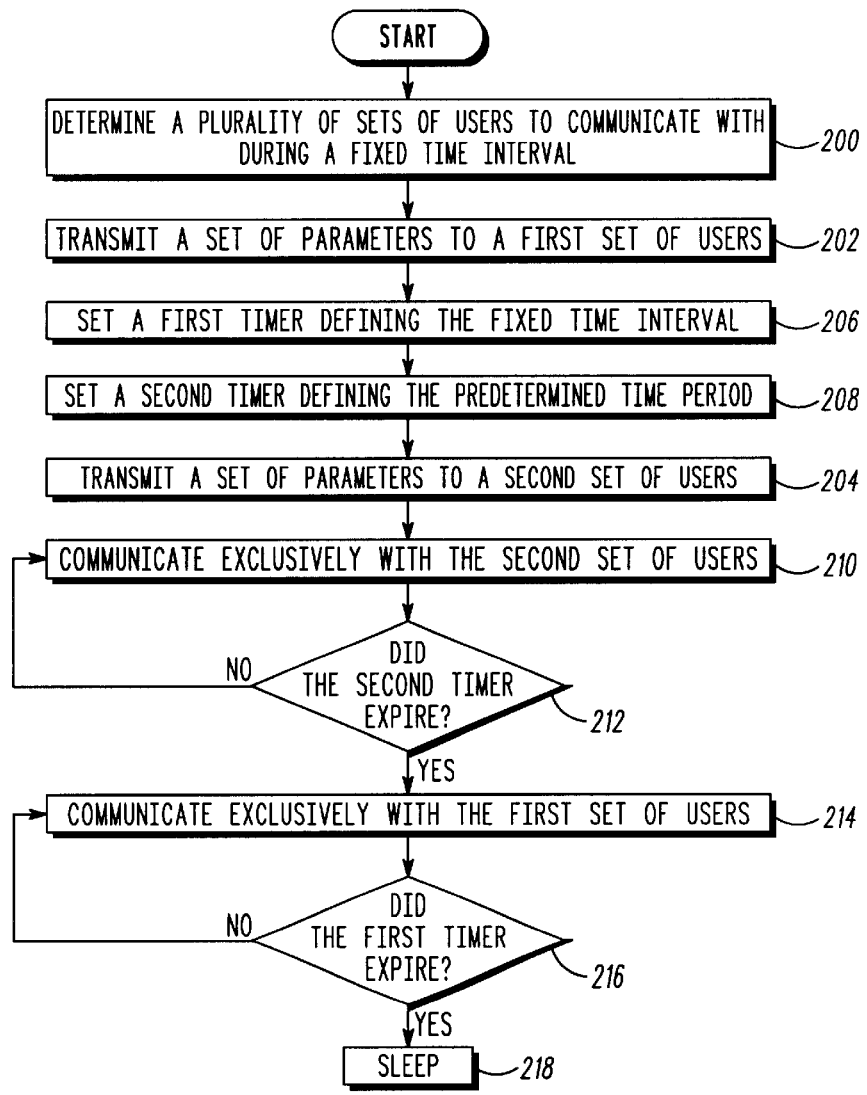
FIG. 2 illustrates a flowchart by which the access point schedules and coordinates the transmissions to and from the mobile stations in accordance with the present invention.

FIG. 2 illustrates a flow chart by which the AP 100 schedules and coordinates transmissions to and/or from two sets of users 102, 104 during a group aggregate communication time in accordance with the present invention. First, at step 200, the AP 100 determines which MSs belonging to a first set of users 102 and which MSs belonging to a second set of users 104 it will communicate with during the group aggregate communication time using existing algorithms as currently known in the art. In the preferred embodiment, the present invention defines the group aggregate communication time as beginning with a first set of parameters (e.g., a Beacon message, or the like) transmitted by the AP 100 intended for a set of users (either the first set of users 102 or the second set of users 104) and ending with a second set of parameters transmitted by the AP 100 intended for the same set of users to which the first set of parameters was intended. Thus, the superframe for the set of users to which the AP 100 communicates with first (e.g., the set of users to which the first set of parameters is intended) defines the group aggregate communication time; the term superframe is generally accepted in the art as an interval of time between consecutive sets of parameters intended for the same set of users, inclusive of the first set of parameters, but not the second set of parameters.

The MSs identified in the sets comprise MSs to which outbound messages are addressed during the group aggregate communication time, MSs to be polled for inbound messages during the group aggregate communication time, and MSs which can send inbound messages without solicitation during the group aggregate communication time. The present invention defines outbound messages as messages originating at the AP 100 and terminating at the MS; the present invention further defines inbound messages as messages originating at the MS and terminating at the AP 100.

Once the sets of users have been determined, the AP 100 transmits a set of parameters to each set of users at steps 202 and 204; the sets of parameters transmitted to the sets of users can be different or the same. Some examples of the parameters are, but not limited to, service set identifier (SSID), frequency, and maximum channel rate. Preferably, upon transmission of the first set of parameters transmitted by the AP 100 at step 202, the AP 100 sets a first timer (not shown) at step 206 and a second timer (not shown) at step 208. The first timer keeps track of the group aggregate communication time; the interval of time between transmitting the first set of parameters intended for the first set of users 102 and transmitting the next set of parameters intended for the first set of users 102. The second timer keeps track of the single group communication time; the interval of time scheduled for communication with a set of users. It should be noted that a single timer might be used to keep track of both communication times.

Once the AP 100 has transmitted a set of parameters intended for each set of users, and the timers have been set, the AP 100 begins to communicate with the a set of users for a period of time at step 210. In the preferred embodiment, the AP 100 communicates with the sets of users in reverse order, in which the AP 100 transmitted the sets of parameters. For example, if the AP 100 transmits the set of parameters intended for the first set of users 102 before it transmits the set of parameters intended for the second set of users 104, the AP 100 will communicate with the second set of users 104 before communicating with the first set of users 102; likewise, if the AP 100 determined that it will communicate with a third set of users (not shown) and the AP 100 transmits the set of parameters intended for the third set of users after transmitting the set of parameters intended for the second set of users 104, the AP 100 would communicate with the third set of users before communicating with the second set of users 104. It should be noted, however, the AP 100 is not limited to communicating with the different sets of users in reverse order, but rather can communicate with the different sets of users in any order.

Figure 3:
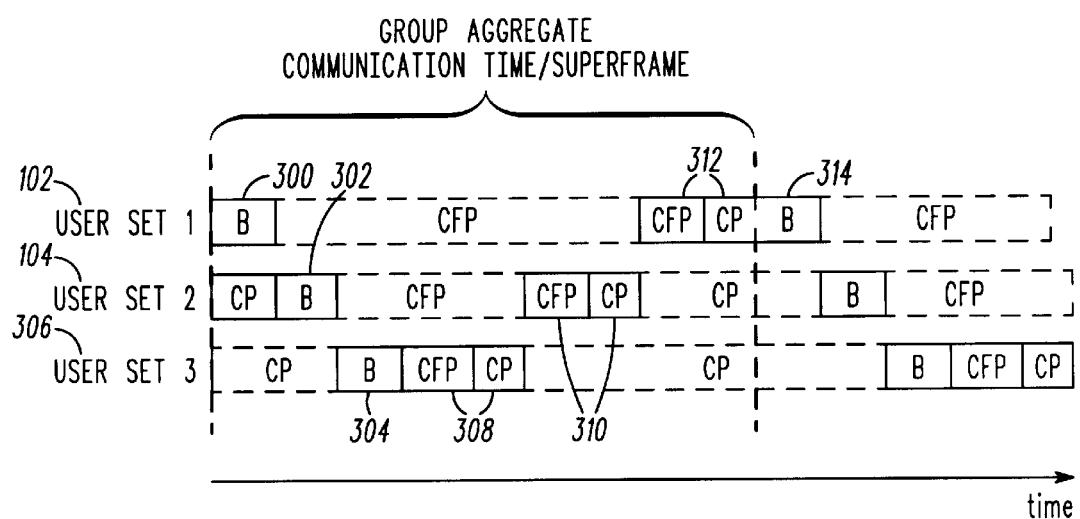
FIG. 3 illustrates an example of the timing of the first set of users, the second set of users, and a third set of users during the group aggregate communication time in accordance with the present invention.

The single group communication time in which the AP 100 communicates with one set of users, however, is exclusive from the single group communication time in which the AP 100 communicates with another set of users. Preferably, as illustrated in FIG. 3, the single group communication time in which the AP 100 communicates with a set of users is segmented into a contention-free period (CFP) and a contentious period (CP), depending on the amount of scheduled transmissions. The contention-free period is facilitated by a transmission schedule established by the AP 100. The transmission schedule identifies when to poll a MS for inbound message(s) and when to transmit outbound message(s) to a MS. The AP 100 can establish the transmission schedule at anytime after the set of users has been identified.

The example illustrated in FIG. 3 depicts that the AP 100 transmits a first set of parameters or Beacon message (B) 300 intended for the first set of users 102, followed by a second set of parameters 302 intended for the second set of users 104, further followed by a third set of parameters 304 intended for yet a third set of users 306. The AP 100 communicates with the third set of users 306 for a first single group communication time 308 prior to communicating with the second set of users 104; the AP 100 communicates with the second set of users 104 for a second single group communication time 310 prior to communicating with the first set of users 102 for a third group communication time 312. In the preferred embodiment, the single group communication times 308, 310, 312 in which the AP 100 communicates with the third, second, and first sets of users 306, 104, 102, respectively, occurs prior to the AP 100 transmitting a subsequent set of parameters 314 intended for the first set of users 102, at which time, the process repeats. Again, it should be noted that the AP 100 is not limited to communicating with the different sets of users in reverse order, but rather can communicate with the different sets of users in any order.

Referring back to FIG. 2, the single group communication time dedicated to communicating with a set of users is tracked by the second timer at step 212. In other words, upon expiration of the second timer, the AP 100 ceases communication with the current set of users and begins communication with the next set of users at step 214. If there are more than two sets of users, the AP 100 can set multiple timers to indicate the beginning of communications between the AP 100 and a new set of users or the ending of communication with the current set of users; alternatively, the AP 100 can continually reset the second timer for a single group communication time allotted to the next set of users upon expiration. It should be noted that the amount of time in which the AP 100 communicates with the one set of users may not necessarily be the same amount of time in which the AP 100 communicates with another set of users. It should also be noted that, in the preferred embodiment, communication between the AP 100 and all the sets of users must be completed before expiration of the first timer at step 216 (i.e., prior to the AP 100 transmitting a next set of parameters intended for the same set of users in which the first set of parameters transmitted by the AP 100 were intended), at which time, the AP 100 enters a sleep mode at step 218 until the next group aggregate communication time. The present invention, however, does not limit the system to require that all sets of users are communicated with before the expiration of the first timer, but it is likely that this will be the case in practice.

Figure 4:
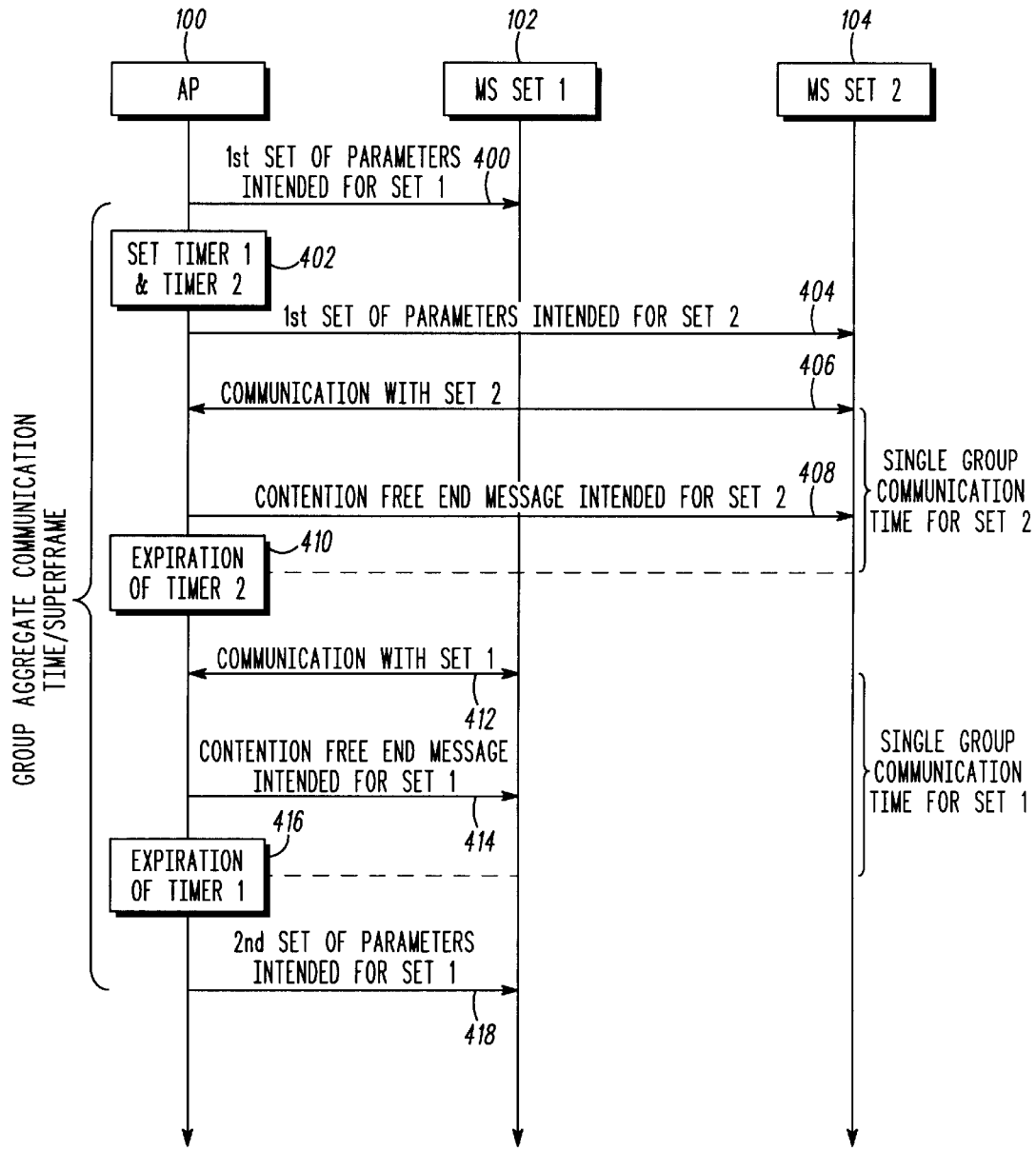
FIG. 4 illustrates an example of a message sequence flow diagram in accordance with the present invention.

Let us now look at an example of the present invention. FIG. 4 illustrates an example of a message sequence flow diagram for the system operation in accordance with the preferred embodiment of the present invention. The present invention assumes that the AP 100 and the MSs 102, 104 are functioning properly, and the MSs 102, 104 are registered and associated with the AP 100. In this example, the AP 100 identifies two sets of MSs 102, 104 with which it will communicate prior to expiration of the first timer, and the transmission schedule for each set of users identifying the order of inbound and outbound transmissions. In this example, once the processing has been completed, the AP 100 transmits a first set of parameters (e.g., a beacon message or the like) intended for the first set of users 102 at step 400. After transmitting the first set of parameters, the AP sets the first and second timers, and preferably transmits any multicast and/or broadcast messages intended for the first set of users 102 at step 402. These multicast/broadcast messages typically contain information pertinent to the first set of users 102, for example, server announcements, or information to improve system operation. After the AP 100 transmits the first set of parameters and sets the timer(s), the AP 100 transmits a second set of parameters intended for the second set of users 104 at step 404, and preferably any multicast and/or broadcast messages intended for the second set of users 104. It should be noted that the AP 100 at any point during the group aggregate communication time, however, can transmit these multicast/broadcast messages.

In this example, after the AP 100 has transmitted a set of parameters intended for each set of users to which it will communicate prior to expiration of the first timer, the AP 100 begins to communicate with the sets of users in reverse order of transmission of the sets of parameters. Thus, the AP 100 begins to communicate with the second set of users 104 in accordance with the transmission schedule for the second set of users until the expiration of the second timer. If there is any time remaining in the single group communication time allocated for the second set of users 104 after all of the scheduled transmissions and acknowledgments have been transmitted, the AP 100 typically transmits a contention free end message that allows the air interface to become contentious for the second set of users 104 until the expiration of the second timer. Upon expiration of the second timer, the AP 100 ceases communication with the second set of users 104 and begins communication with the first set of users 102 for a single group communication time allocated to the first set of users 102. It is important to reiterate that the single group communication time allocated to the first set of users 102 and the single group communication time allocated to the second set of users 104 may be different intervals of time. Since this example only has two sets of users, the single group communications time in which the AP 100 communicates with the first set of users 102 lapses upon expiration of the first timer, at which time the AP 100 transmits the next set of parameters intended for the first set of users 102. The parameters, an individual MS, the number of MSs in the set, the number of sets of users communicated with during the group aggregate communication time, etc., can change or remain the same for subsequent group aggregate communication times.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

Moreover, the term "a" or "an", as used herein, are defined as one or more than one. The term "plurality", as used herein, defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

We claim:

1. A method comprising the steps of:
   transmitting at least a first set of parameters intended for a first set of users and a second set of parameters intended for a second set of users;
   communicating with the first set of users during a first time period;
   communicating with the second set of users during a second time period; and
   transmitting a next set of parameters intended for the first set of users,
   wherein the first time period and the second time period are exclusive of each other, and wherein the first time period and the second time period lapse prior to the step of transmitting the next set of parameters intended for the first set of users.

2. The method of claim 1 wherein each set of parameters is conveyed in a beacon message.

3. The method of claim 1 wherein a time interval between transmitting the first set of parameters and transmitting the next set of parameters defines a superframe, and wherein the steps of communicating are completed prior to the end of the superframe.

4. The method of claim 1 wherein the step of communicating with the first set of users is at a first frequency, and wherein the step of communicating with the second set of users is at a second frequency.

5. The method of claim 1 wherein the first set of users operates in a full duplex mode, and wherein the second set of users operates in a half-duplex mode.

6. The method of claim 1 wherein the first set of user and the second set of users each comprise at least one mobile station.

7. The method of claim 1 wherein the step of communicating with the first set of users and the step of communicating with the second set of users is at a common frequency.

8. The method of claim 1 wherein both the first time period and the second time period are segmented into a non-contentious period and a contentious period, which are exclusive of each other.

9. The method of claim 1 further comprising the step of setting a timer upon transmission of the first set of parameters intended for the first set of users, and wherein the next set of parameters intended for the first set of users is transmitted upon expiration of the timer.

10. The method of claim 1 further comprising the step of setting a timer upon transmission of the first set of parameters intended for the first set of users, and wherein one of the steps of communicating ends and the other step of communicating begins upon expiration of the timer.

11. The method of claim 1 wherein at least a portion of the steps are implemented in hardware.

12. The method of claim 1 wherein at least a portion of the steps are implemented in software.

13. The method of claim 1 further comprising the steps of:
    transmitting a third set of parameters intended for a third set of users; and
    communicating with the third set of users during a third time period,
    wherein the third time period is exclusive of the first time period and the second time period, and wherein the third time period lapses prior to the step of transmitting the next set of parameters intended for the first of users.

14. The method of claim 1 wherein the first set of parameters and the second set of parameters are different.

15. The method of claim 1 wherein the first set of parameters and the second set of parameters are the same.

16. The method of claim 1 wherein the first set of parameters and the next set of parameters are different.

17. The method of claim 1 wherein the first set of parameters and the next set of parameters are the same.

18. A storage medium having stored thereon a set of instructions which, when loaded into a microprocessor, causes the microprocessor to perform the following functions:
    transmitting at least a first set of parameters intended for a first set of users and a second set of parameters intended for a second set of users;
    communicating with the first set of users during a first time period;
    communicating with the second set of users during a second time period; and
    transmitting a next set of parameters intended for the first set of users, wherein the first time period and the second time period are exclusive of each other, and wherein the first time period and the second time period lapse prior to the step of transmitting the next set of parameters intended for the first set of users.

* * * * *